(12) United States Patent
Yamaguchi

(10) Patent No.: US 10,088,823 B2
(45) Date of Patent: Oct. 2, 2018

(54) NUMERICALLY CONTROLLED MACHINE TOOL FOR DIRECT AND MANUAL OPERATION OF MOVABLE PART

(71) Applicant: FANUC Corporation, Minamitsuru-gun, Yamanashi (JP)

(72) Inventor: Meguru Yamaguchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 237 days.

(21) Appl. No.: 14/930,853

(22) Filed: Nov. 3, 2015

(65) Prior Publication Data

US 2016/0154398 A1    Jun. 2, 2016

(30) Foreign Application Priority Data

Nov. 28, 2014 (JP) .................................. 2014-241014

(51) Int. Cl.
*G05B 19/19* (2006.01)
*G05B 19/423* (2006.01)

(52) U.S. Cl.
CPC ........... *G05B 19/19* (2013.01); *G05B 19/423* (2013.01); *G05B 2219/34013* (2013.01); *G05B 2219/36429* (2013.01)

(58) Field of Classification Search
CPC .................. G05B 19/19; G05B 19/423; G05B 2219/34013; G05B 2219/36429
USPC ................................................... 700/170, 63
See application file for complete search history.

(56) References Cited

U.S. PATENT DOCUMENTS

| 4,408,286 | A | * | 10/1983 | Kikuchi | ................... | B25J 9/046 |
| | | | | | | 318/568.14 |
| 5,283,508 | A | | 2/1994 | Komatsu | | |
| 5,371,452 | A | * | 12/1994 | Kato | .................... | G05B 19/416 |
| | | | | | | 318/568.15 |
| 5,808,888 | A | | 9/1998 | Susnjara et al. | | |
| 6,088,628 | A | * | 7/2000 | Watanabe | .............. | B25J 9/1656 |
| | | | | | | 700/251 |

(Continued)

FOREIGN PATENT DOCUMENTS

| DE | 19943318 A1 | 3/2001 |
| EP | 0784253 A1 | 7/1997 |

(Continued)

OTHER PUBLICATIONS

Notification of Reasons for Refusal dated Feb. 28, 2017 in Japanese Patent Application No. 2014-241014 (5 pages) with an English translation (3 pages).

(Continued)

*Primary Examiner* — Kenneth M Lo
*Assistant Examiner* — Mohammed Shafayet
(74) *Attorney, Agent, or Firm* — Drinker Biddle & Reath LLP

(57) ABSTRACT

A servo motor is driven to rotate a feed axis to move a movable part of a machine tool controlled by a numerical controller in a feed axis direction. A sensor that senses force from the outside (worker) applied to the movable part and a direction of the force is provided on the movable part. The numerical controller generates a movement command for moving the movable part in the direction of the force detected by the sensor and drives the servo motor based on the movement command.

8 Claims, 5 Drawing Sheets

(56) References Cited

U.S. PATENT DOCUMENTS

| | | | |
|---|---|---|---|
| 6,212,443 B1* | 4/2001 | Nagata | G05B 19/423 |
| | | | 318/568.13 |
| 6,216,056 B1* | 4/2001 | Ito | B25J 9/16 |
| | | | 700/157 |
| 6,385,508 B1* | 5/2002 | McGee | B25J 9/0081 |
| | | | 285/189 |
| 2007/0250227 A1* | 10/2007 | Fossen | G05D 1/0875 |
| | | | 701/21 |
| 2013/0110290 A1* | 5/2013 | Geffard | B25J 9/1679 |
| | | | 700/258 |
| 2013/0184871 A1* | 7/2013 | Fudaba | B25J 13/02 |
| | | | 700/264 |
| 2015/0081099 A1* | 3/2015 | Komatsu | B25J 13/085 |
| | | | 700/258 |
| 2015/0142268 A1* | 5/2015 | Millsap | B62D 5/0481 |
| | | | 701/41 |
| 2015/0224647 A1* | 8/2015 | Dumora | B25J 9/1679 |
| | | | 700/245 |
| 2015/0277420 A1 | 10/2015 | Heijman et al. | |
| 2016/0253019 A1* | 9/2016 | Geaghan | G06F 3/041 |

FOREIGN PATENT DOCUMENTS

| | | |
|---|---|---|
| JP | S59-157715 A | 9/1984 |
| JP | S59-187438 A | 10/1984 |
| JP | H03-58103 A | 3/1991 |
| JP | H03-123907 A | 5/1991 |
| JP | H04-283047 A | 10/1992 |
| JP | H04-348843 A | 12/1992 |
| JP | H07-148646 A | 6/1995 |
| JP | H08-257873 A | 10/1996 |
| JP | 2000-061776 A | 2/2000 |
| JP | 2002-120175 A | 4/2002 |
| JP | 2009-06465 A | 1/2009 |
| JP | 2012-55985 A | 3/2012 |
| JP | 2013-125453 A | 6/2013 |
| WO | WO-2014/072869 A1 | 5/2014 |

OTHER PUBLICATIONS

Extended European Search Report dated Apr. 25, 2016 in corresponding European Patent Application No. 15193347.0.

* cited by examiner

NUMERICALLY CONTROLLED MACHINE TOOL FOR DIRECT AND MANUAL OPERATION OF MOVABLE PART

RELATED APPLICATION DATA

This application claims priority under 35 U.S.C. § 119 and/or § 365 to Japanese Application No. 2014-241014 filed Nov. 28, 2014, the entire contents is incorporated herein by reference.

BACKGROUND OF THE INVENTION

Field of the Invention

The present invention relates to a numerically controlled machine tool that executes a cutting machining and the like a workpiece.

Description of the Related Art

In a machine tool controlled by a numerical controller, "setup work", such as installation of a tool on the machine tool, installation of a material that is a workpiece to be machined, and checking of precise installation of the tool and the material on the machine tool, is performed before the start of machining. In the "setup work", a worker performs the work by moving a movable part driven by feed axes of the machine tool, in an arbitrary direction and at an arbitrary velocity. A "manual feed" function included in the numerical controller is used to move the movable part in the arbitrary direction at the arbitrary velocity. More specifically, the worker uses an operation panel or a handy operation panel for remote operation included in the numerical controller to select and designate the velocity and the movement direction to move the movable part at the arbitrary direction and velocity desired by the worker (see Japanese Patent Application Laid-Open Nos. 2013-125453, 2000-61776, and 8-257873).

The velocity and the movement direction need to be input from the operation panel or the handy operation panel to perform the "manual feed". To do so, a feed axis (for example, X axis, Y axis, or Z axis) for moving the movable part needs to be selected, the direction (positive direction or negative direction) in which the selected axis is to be moved needs to be selected and designated, and the movement velocity of the selected axis needs to be set. Furthermore, the worker needs to recognize in advance the coordinate system provided in the machine tool.

The feed axis and the movement direction of the feed axis instructed in the operation panel or the handy operation panel need to coincide with the movement direction in which the worker intends to move the movable part. For example, the worker attempts to move the movable part from left to right and determines that the movement direction is the X-axis positive direction. The worker inputs the X axis for the feed axis of manual feed and inputs the positive direction for the direction of the feed axis. However, if the direction for moving the movable part from left to right is actually the X-axis negative direction, the movable part moves in a direction not intended by the worker.

The operation panel or the handy operation panel includes a large number of operation members, such as an operation switch and a keyboard, and the worker needs to operate an operation member for setting the feed axes as well as the feed direction and the velocity of the feed axes by selecting the operation member from the large number of operation members.

In this way, operating the operation panel or the handy operation panel to move the movable part in the direction intended by the worker is not easy, and a certain skill is necessary.

SUMMARY OF THE INVENTION

An object of the present invention is to provide a numerically controlled machine tool in which manual feed of a movable part is easy.

The present invention provides a numerically controlled machine tool including a numerical controller that drives and controls servo motors for driving a plurality of feed axes to move a movable part, the numerically controlled machine tool including: a sensor provided on the movable part to sense force from outside applied to the movable part and a direction of the force; and a movement command generation unit that generates a movement command for moving, in the direction of the force detected by the sensor, the movable part in which the force is detected, wherein the servo motors are driven based on the movement command generated by the movement command generation unit.

The sensor may be a force sensor that detects magnitude of the force and the direction of the force, and the movement command generation unit may be configured to generate the movement command by changing a movement velocity according to a change in the magnitude of the force detected by the sensor.

Removable jigs may be provided on the sensor, and the magnitude of the force and the direction of the force may be input to the sensor through the jigs.

The sensor may be a touch sensor, the touch sensor may be arranged on a surface of the movable part so that a direction of touching the touch sensor coincides with a direction of a movement axis in which the movable part is to be moved, and the touch sensor may detect the direction of the force applied from outside.

The movement command generation unit may be configured to generate the movement command at a set movement velocity that can be switched and set.

The numerically controlled machine tool may further include signal blocking means for blocking signal transmission, the signal blocking means provided in the middle of transmission means for transmitting a detection signal detected by the sensor to the numerical controller.

The sensor may be provided on the surface of the movable part.

According to the present invention, when the worker directly applies force in a direction in which the movable part is to be moved, the servo motors of the feed axes drive the movable part in the direction of the applied force. The worker can move the movable part with small force as if the worker is manually moving the movable part. Even if the worker does not recognize the coordinate system (XYZ coordinate system) provided in the machine tool, the worker can just apply force to the movable part in a desired direction to drive and move the movable part in the direction of the applied force. Therefore, the worker does not move the movable part in an unintended wrong direction.

As a result, "setup work", such as installation of a tool on a machine tool, installation of a material that is a workpiece to be machined, and checking of precise installation of the tool and the material on the machine tool, carried out before the start of processing can be easily carried out.

BRIEF DESCRIPTION OF THE DRAWINGS

These and other objects and features of the present invention will become apparent from the description of the following embodiments with reference to the attached drawings. Among the drawings.

DETAILED DESCRIPTION OF THE PREFERRED EMBODIMENTS

Figure 1:
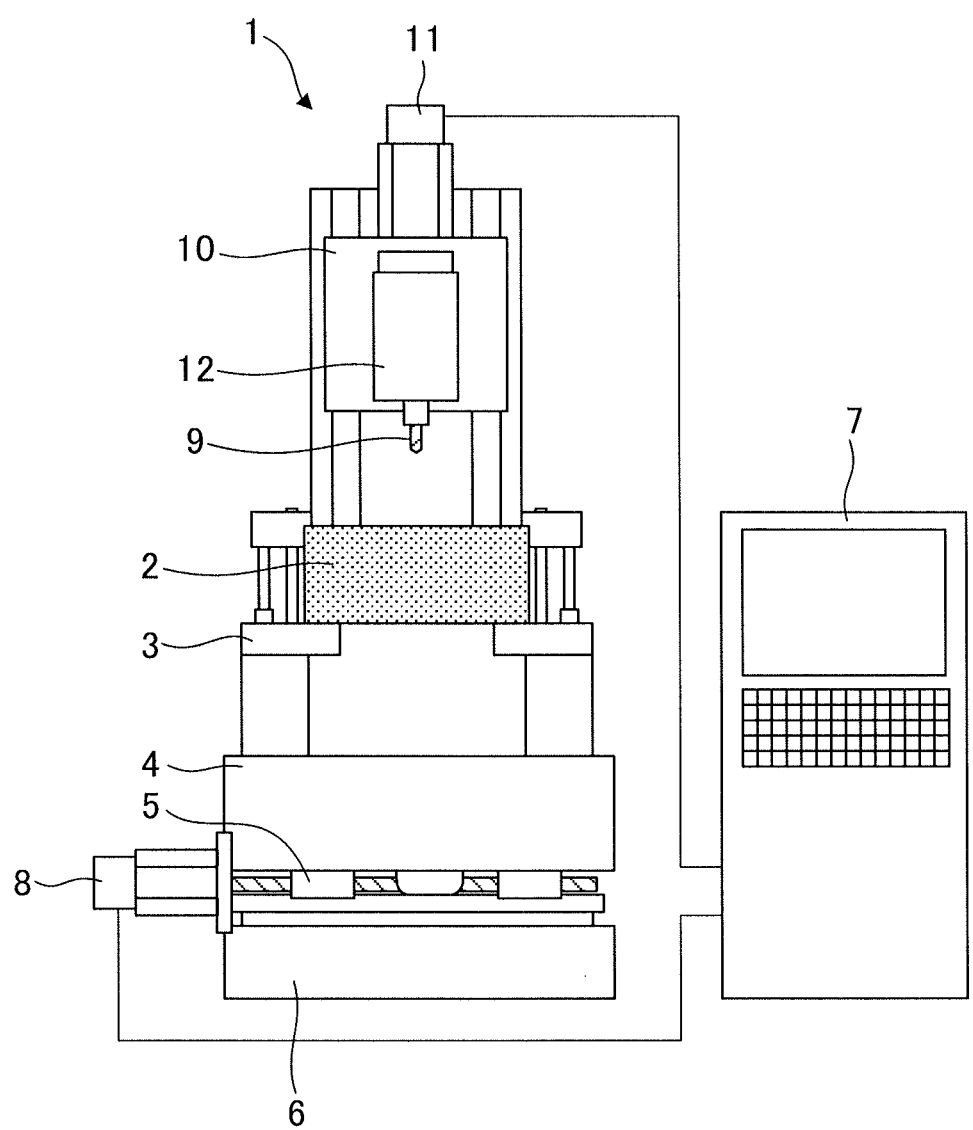
FIG. 1 is a schematic diagram showing an example of a machine tool (hereinafter, called "NC machine tool") controlled by a numerical controller according to the present invention.

FIG. 1 is a schematic diagram showing an example of a machine tool (hereinafter referred to as "NC machine tool") controlled by a numerical controller according to the present invention.

FIG. 1 illustrates an example of a machine tool including feed axes for moving movable parts in three axial directions of X, Y, and Z orthogonal to each other. A workpiece stand 3 is attached to a table 4 that is a movable part, and a material 2 that is a workpiece is attached and fixed to the workpiece stand 3. A guide 5 and the like guide the table 4 over a bed 6 through the feed axes driven by servo motors, and the table 4 moves in two axial directions (X axis and Y axis in this example) orthogonal to each other. In FIG. 1, the X axis is a horizontal direction, and the Z axis is a vertical direction in the drawing. The Y axis is a direction perpendicular to the surface of the paper. FIG. 1 illustrates an X-axis servomotor 8 that drives the table and the like in the X-axis direction. However, a servo motor that drives the table and the like in the Y-axis direction orthogonal to the X axis is not illustrated.

A Z-axis servo motor 11 drives a mechanical section 10 that is a movable part moving in the Z-axis direction that is a direction perpendicular to a movement plane (XY axis plane) of the table 4 and the like. A tool 9 is attached to the mechanical section 10, and the Z-axis servomotor 11 moves the tool 9 in the Z-axis direction. A spindle motor 12 attached to the mechanical section 10 drives the tool 9. A position/velocity detector that detects position/velocity of the servo motor is attached to each servomotor, and the servo motor and the position/velocity detector attached to the servo motor are connected to a numerical controller 7. The numerical controller 7 drives and controls the servo motors to move the table 4, the workpiece stand 3 and the material 2, which are movable parts, in the X and Y directions and to move the tool 9 in the Z-axis direction.

Figure 2:
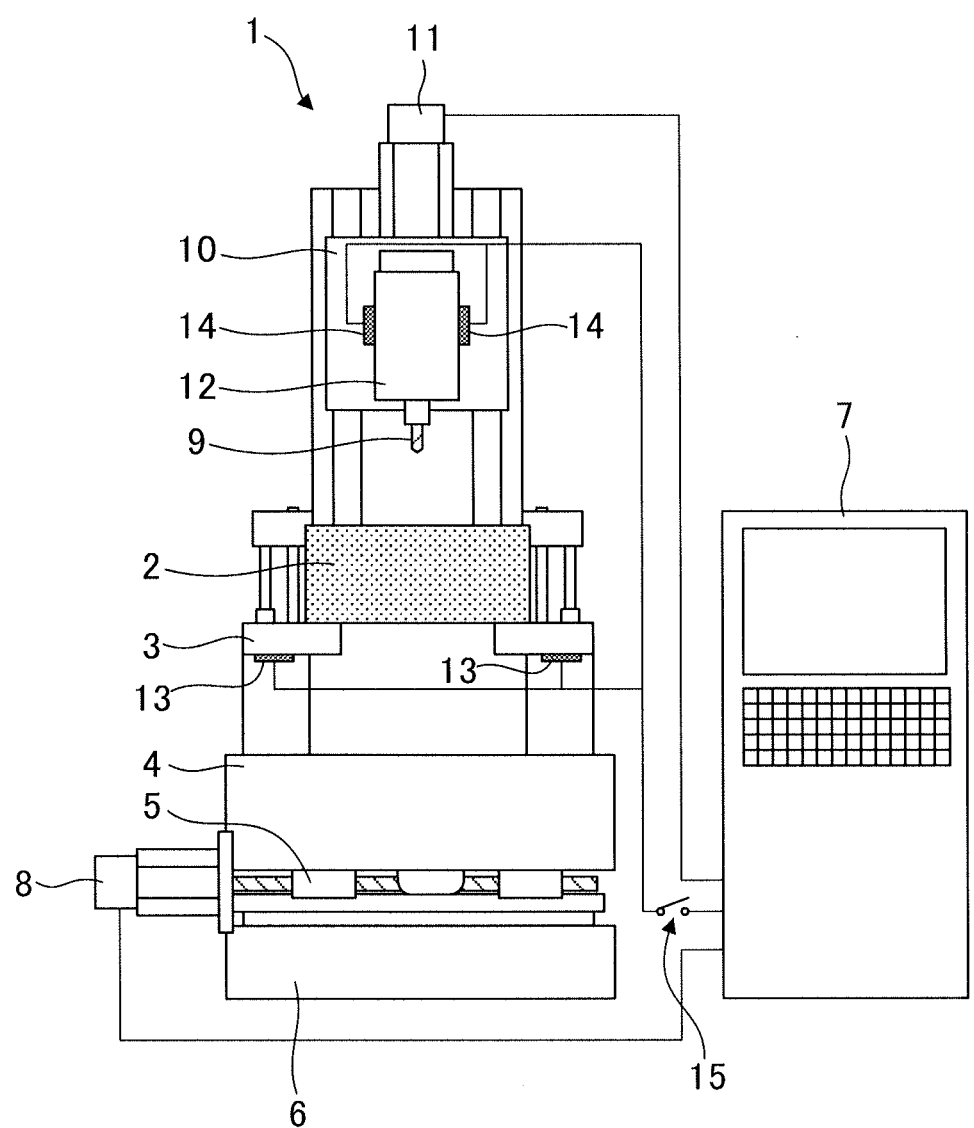
FIG. 2 is a diagram describing that an embodiment of the machine tool according to the present invention is formed by applying the present invention to the NC machine tool of FIG. 1.

FIG. 2 is a diagram describing that an embodiment of the machine tool according to the present invention is formed by applying the present invention to the NC machine tool of FIG. 1.

The machine tool of FIG. 2 includes first and second force sensors 13 and 14 and a safety switch 15. The numerical controller 7 is configured to drive the movable parts, such as the table 4 and the mechanical section 10, based on signals detected by the first and second force sensors 13 and 14.

The numerical controller 7 serves as a movement command generation unit that generates movement commands to the movable parts (such as the table 4 and the drive unit 10) based on the signals detected by the first and second force sensors 13 and 14.

In the embodiment illustrated in FIG. 2, the first force sensors 13 are arranged inside of the workpiece stand 3 that is part of the movable parts, and the first force sensors 13 detect the direction and the magnitude of the force applied to the material 2, the workpiece stand 3 or the table 4. The tool 9 and the spindle motor 12 are attached to the mechanical section 10, and the servo motor 11 drives the tool 9 and the spindle motor 12 in the Z-axis direction. The second force sensors 14 are provided inside of the mechanical section 10, and the second force sensors 14 detect the direction and the magnitude of the force applied to the mechanical section 10 or the tool 9 attached to the mechanical section 10. The positions for arranging the first force sensors 13 may be the surface of the movable part.

Figure 5:
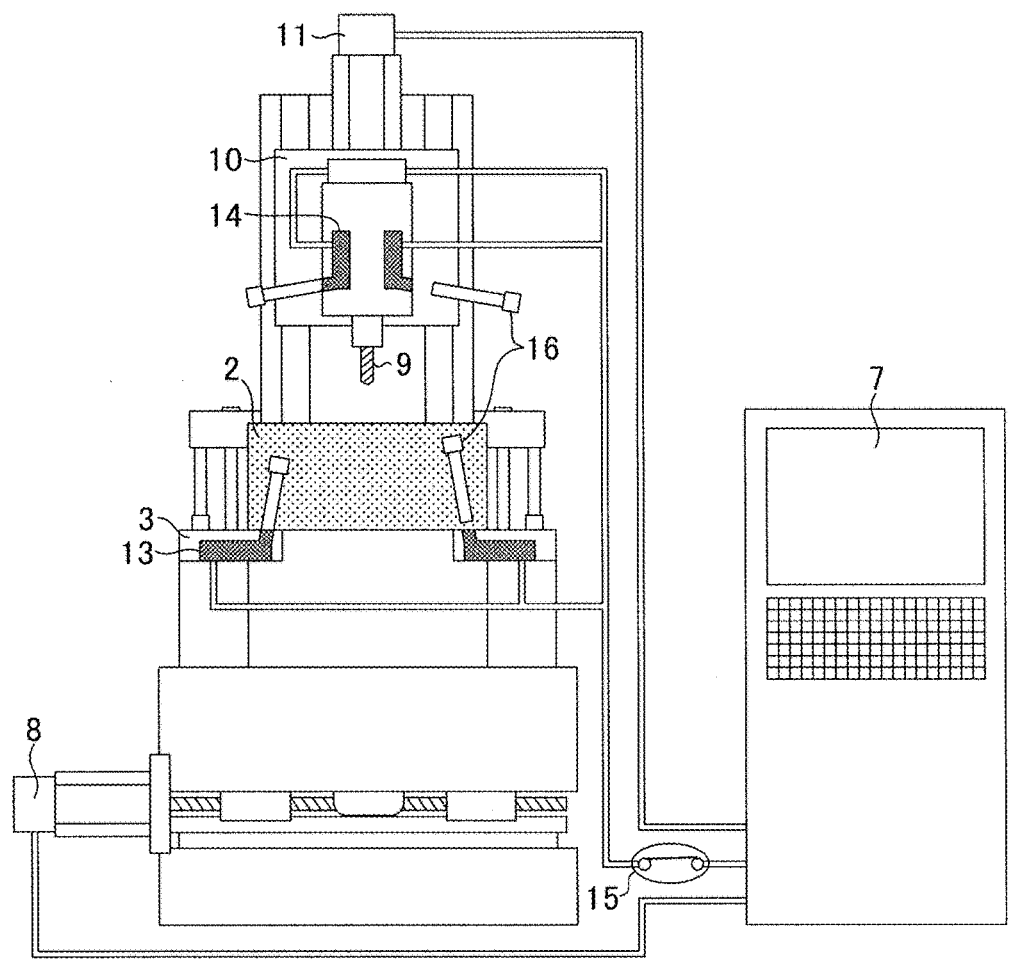
FIG. 5 is a diagram describing a modified example of the machine tool according to the present invention illustrated in FIG. 2, in which removable jigs are provided on sensors provided on a movable part.

As shown in FIG. 5, the first and second force sensors 13 and 14 may detect the direction and the magnitude of the force applied by a worker by using removable jigs 16. Strain gauges may be used in place of the force sensors to detect the direction and the magnitude of the force.

The signals from the first and second force sensors 13 and 14 are input to the numerical controller 7, and the safety switch 15 that blocks the signals is provided to prevent the movable parts (such as the table 4, the workpiece stand 3, the material 2, the mechanical section 10, and the tool 9) from operating against the intention of the worker.

When the worker manually moves the movable part during so-called "setup work" for installing the material 2 on the workpiece stand 3, installing the tool 9 and checking the installation, the worker sets a manual feed mode in the numerical controller 7 and turns on the safety switch 15 by a foot pedal or the like, thereby allowing reception of the signals from the first and second force sensors 13 and 14 to start the manual feed operation.

When the worker directly applies force to the movable part (such as the table 4, the workpiece stand 3, the material 2, the mechanical section 10, and the tool 9), the first force sensors 13 or the second force sensors 14 detect the same direction and magnitude as the applied force and output analog or digital signals to the numerical controller 7. The numerical controller 7 moves the movable part by driving the servo motor of the feed axis that drives the movable part so as to move the movable part in the direction of the force applied to the movable part by the worker based on the detection signals from the first force sensors 13 or the second force sensors 14. Since the servo motor outputs force so as to assist the force applied by the worker, the worker just gently pushes the movable part to move the movable part. When the worker stops the force applied to the movable part, the numerical controller does not receive force detection signals from the force sensors. Therefore, the numerical controller stops the movement command to the servo motor. As a result, the assist force of the servo motor is also stopped, and the movement of the movable part is stopped.

For example, when the worker applies force in the X-axis direction (horizontal direction in the drawings) to the material 2, the workpiece stand 3, or the table 4 that is a movable part, the first force sensors 13 sense the force. The numerical controller 7 receives sensing signals from the first force sensors 13 and drives the X-axis servo motor 8 in the direction of the sensed force to apply assist force to the movable part (table 4). Combined force of the force applied by the worker and the assist force from the servo motor 8 is applied to the movable part (material 2, workpiece stand 3, or table 4), and the small force applied by the worker moves the movable part in the direction of the force applied in the X-axis direction. Similarly, when the worker applies force to the movable part, which is one of the material 2, the workpiece stand 3, and the table 4, in the Y-axis direction, the Y-axis servo motor is driven to move the movable part in the direction of the force applied by the worker. When the worker applies force to the tool 9 or the mechanical section 10, the Z-axis servo motor 11 is driven to generate assist force for assisting the force applied by the worker to move the tool 9 or the mechanical section 10 in the direction of the force applied by the worker.

In this way, in the manual operation mode, the worker just gently applies force in the direction in which the movable part is to be moved. The servo motor that drives the movable part is driven to move the movable part in the direction of the applied force, and the assist force is generated.

In the present invention, examples of the method of driving the servo motor of each feed axis to assist the force applied by the worker include (1) a method of driving the servo motor that assists the force by changing the velocity of the servomotor according to the magnitude of the force applied by the worker and (2) a method of driving the servo motor that assists the force at a predetermined velocity regardless of the magnitude of the force applied by the worker.

Figure 3:
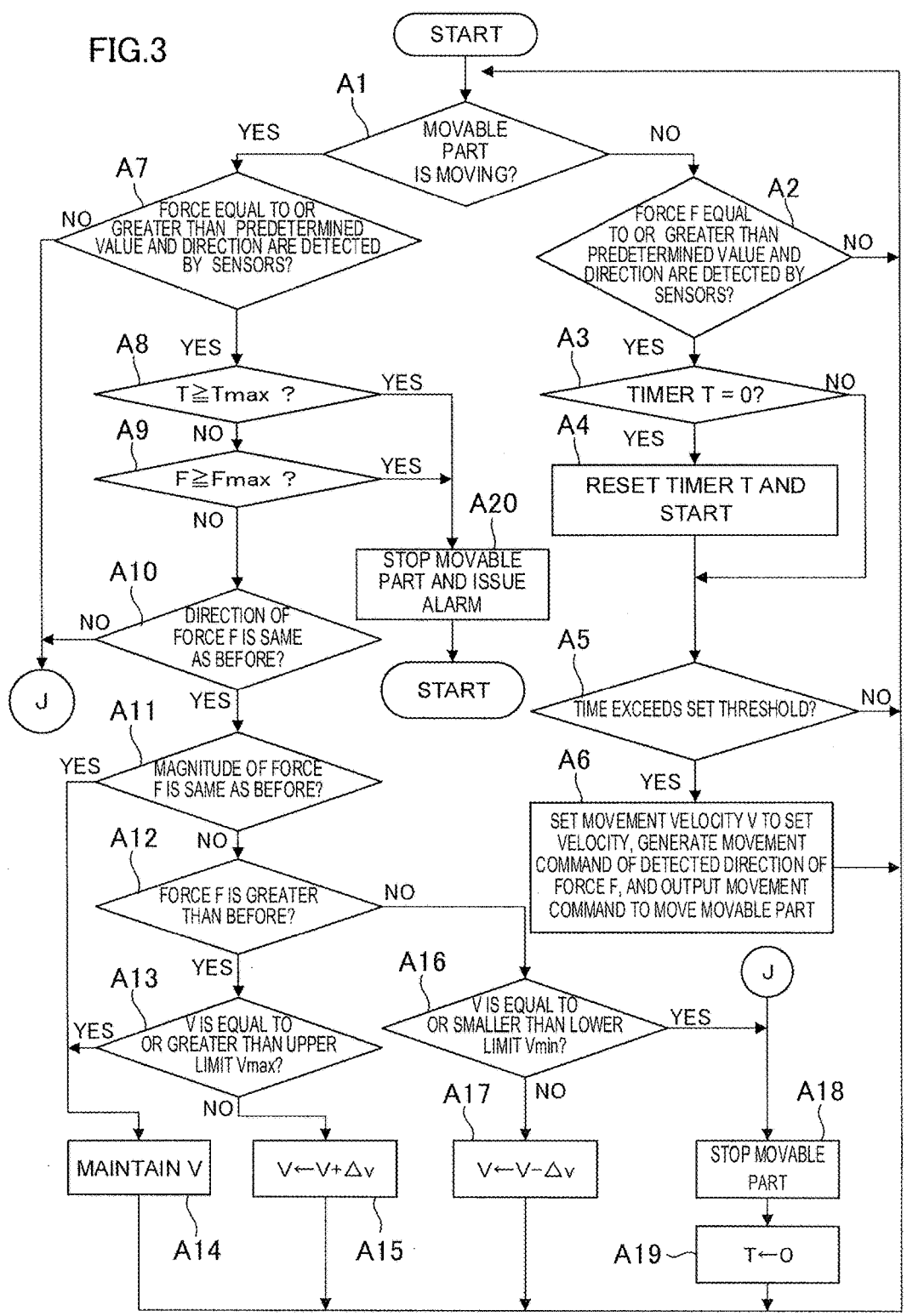
FIG. 3 is a flow chart showing an algorithm of a control process of a first mode of manual feed carried out by a processor of a numerical controller 7.

(1) First Mode of Manual Feed for Driving Servo Motor that Generates Assist Force by Changing Velocity of Servo Motor According to Magnitude of Force Applied by Worker FIG. 3 is a flow chart showing an algorithm of a control process of a first mode of the manual feed carried out by a processor of the numerical controller 7.

When the manual feed mode is set in an operation panel or the like of the numerical controller 7, the processor of the numerical controller 7 starts the process shown in FIG. 3. The worker uses the foot pedal or the like to turn on the safety switch 15 and directly applies force in a direction in which the movable part (such as the table 4, the workpiece stand 3, the material 2, the mechanical section 10, and the tool 9) is to be moved. Consequently, the processor of the numerical controller 7 determines whether the movable part is moving or not (step A1). If the movable part is not moving, the processor reads the signals from the first and second force sensors 13 and 14 and determines whether force equal to or greater than a predetermined value and the direction of the force are detected or not (step A2). If force equal to or greater than the predetermined value and the direction of the force is not detected, the process returns to step A1.

The processor repeats the process of steps A1 and A2. When the processor detects force equal to or greater than the predetermined value and the direction of the force, the processor determines whether a timer T is "0" or not (step A3). Since the timer T is "0" at an initial stage, the processor causes the timer T to start counting (step A4) and determines whether counted time of the timer T exceeds a set threshold or not (step A5). More specifically, the processor determines whether the force equal to or greater than the predetermined value is continuously detected for at least predetermined time. If the counted time of the timer T does not exceed the set threshold, the process returns to step A1 and repeatedly executes the process of steps A1, A2, A3, A5, and A1 until the force equal to or greater than the predetermined value continuously exceeds the set threshold. Once the timer T starts counting in step A4 (without being reset in the middle), the process proceeds from step A3 to step A5.

The process of moving from step A1 to step A5 and then returning to step A1 is repeatedly executed in order to prevent the movable part from starting to move after the worker unintentionally and instantaneously touches the movable part. When continuous application of a force equal to or greater than the predetermined value for a time longer than the set threshold is sensed, it is assumed that the worker is intentionally operating, and the movable part is moved in the direction in which the force is applied.

When the processor determines that the force equal to or greater than the predetermined value is continuously applied for a time longer than the set threshold in step A5, the processor sets a movement velocity V to a set velocity that is set in advance, generates a movement command for moving the movable part in the direction of the applied force F (direction of the force detected by the first and second force sensors 13 and 14), and outputs the movement command to a servo control unit to drive the servo motor that drives the feed axis for moving the movable part to thereby start the movement of the movable part (step A6). More specifically, the processor of the numerical controller 7 outputs the movement command of the set velocity to the servo control unit of the servo motor of the feed axis in the direction of the applied force to drive the servo motor of the feed axis to move the movable part. Then the process then returns to step A1.

When the movable part starts to move, the processor determines that the movable part is moving in step A1 and process proceeds to step A7. In step A7, the processor determines whether or not the first and second force sensors 13 and 14 have detected force equal to or greater than the predetermined value and the direction of the force. If the force equal to or greater than the predetermined value and the direction are not detected, the process proceeds to step A18 to stop the movement of the movable part and resets the timer T to "0" (step A19). Then the process returns to step A1.

On the other hand, if the processor determines that the first and second force sensors 13 and 14 have detected force equal to or greater than the predetermined value and the direction of the force in step A7, the processor determines whether or not the time counted by the timer T provided for safety is equal to or greater than a set limit time Tmax and determines whether or not the detected force F is equal to or greater than a set maximum force Fmax (steps A8 and A9). In normal operation, the counted time of the timer T does not exceed the set limit time Tmax, and the detected force F is not equal to or greater than the set maximum force Fmax. In this case, the process proceeds to step A10 and determines whether or not the direction of the force F detected by the first and second force sensors 13 and 14 is the same direction as before. If the direction of the force F is the same direction as before, the processor determines whether or not the magnitude of the detected force F is the same force as before (step A11). If the magnitude is the same and not changed, the processor does not change the movement velocity V, maintains the same velocity as before, generates a movement command, and outputs the movement command to the servo control unit to drive the servo motor to move the movable part (step A14).

On the other hand, if the processor determines in step A11 that the detected force F is not the same force as before, the processor determines whether or not the force F is greater than before, that is, whether the worker has increased the operating force or not (step A12). If the force F is increased, the processor determines whether or not the current velocity V of the movement command is equal to or greater than an upper limit Vmax (step A13). If the velocity V is not equal to or greater than the upper limit Vmax, the processor increases the velocity V of the movement command by a predetermined amount Δv, generates a movement command at the increased movement velocity, and outputs the movement command to the servo control unit to drive the servo motor (step A15). Then the process returns to step A1. In this way, the instructed velocity of the movement command is increased, and the movement velocity of the movable part increases. If the processor determines that the current velocity V of the movement command is equal to or greater than the upper limit Vmax in step A13, the process proceeds to step A14, and the processor does not change the command velocity V, generates a movement command at the same command velocity as before, and drives the servo motor. Then the process returns to step A1.

On the other hand, if the processor determines in step A12 that the detected force F is smaller than the force detected before, the processor reduces the velocity V of the movement command by the predetermined amount Δv if the command velocity V is not equal to or smaller than a lower limit Vmin (step A16). In this way, the processor generates a movement command at a movement velocity reduced by Δv from the velocity before and drives the servo motor of the feed axis (step A17). Then the process returns to step A1. As a result, the movement velocity of the movable part decreases. On the other hand, if the processor determines that the command velocity V is equal to or smaller than the lower limit Vmin in step A16, the process proceeds to step A18, and the processor stops the movement of the movable part, and resets the timer T to "0". Then the processor returns to step A1.

Therefore, the movement velocity of the movable part is increased or decreased according to the magnitude of the force of the worker pressing the movable part in the process from step A11 to step A17. If the pressing force is increased, the instructed movement velocity increases, and the movement velocity of the movable part increases. If the pressing force is reduced, on the other hand, the instructed movement velocity decreases, and the movement velocity of the movable part decreases. As a result, the worker can control the movement velocity of the movable part based on the pressing force of the movable part.

If the processor determines in step A10 that the direction of the detected force F is different from before, that is, if the worker applies force in a direction different from before to the movable part, the process proceeds from step A10 to step A18, and the processor stops the movement of the movable part and resets the timer T to "0" (step A19). Then the process returns to step A1.

As described above, the process in steps A8 and A9 is a process provided for safety measure. The processor determines that there is an abnormality if the force in the same direction is applied to the movable part for a long time equal to or longer than the set limit time Tmax or if large force equal to or greater than the set maximum force Fmax is applied, and issues an alarm and stops the movement of the movable part (step A20). If the safety switch 15 is released, the signals of the first and second force sensors 13 and 14 are blocked. Therefore, the movement command to the servo motor is stopped, and the movement of the movable part is stopped.

When the movable part needs to be manually fed and positioned at a desired position, the mode is switched to a positioning mode in the manual feed mode. In the positioning mode, the set velocity used in step A6 is switched to a low set velocity for positioning. The values of the upper limit Vmax and the lower limit Vmin in steps A13 and A16 are changed to small values, and the value of the velocity increase/decrease amount Δv used in steps A15 and A17 is switched to a small value for positioning.

As a result, the working velocity of the movable part is low in the positioning mode of manual feed, and the movable part can be stopped and positioned at the position intended by the worker.

As described above, the direction of the force applied to the movable part by the worker is detected, and the movement velocity of the movable part is changed according to the increase or decrease of the magnitude of the applied force to move the movable part in the detected direction of the force in the control process of the first mode of manual feed illustrated in the flow chart of FIG. 3. Therefore, the force applied to the movable part is increased if the movement velocity of the movable part is low, and the force applied to the movable part is reduced if the movement velocity of the movable part is high. In this way, the movement velocity of the movable part can be freely controlled. Since the movement direction of the movable part coincides with the direction of the force applied to the movable part by the worker, the movable part can be moved by manual feed as intended by the worker.

In the first mode of manual feed, the direction of the force applied to the movable part by the worker is a direction of the movement axis for moving the movable part. More specifically, the X-axis servo motor 8 and the Y-axis servo motor (not shown) move the table 4 in the X-axis and Y-axis directions orthogonal to each other as shown in FIG. 2, and the worker applies force in the X-axis and Y-axis directions. The Z-axis servo motor 11 moves the mechanical section 10 in the Z-axis direction, and the worker applies force in the Z-axis direction.

However, in a movable part with a degree of freedom of two or more movement directions (degree of freedom of the table that is a movable part in the embodiment illustrated in FIG. 2 is two, with X and Y axes), the movable part can be moved in an arbitrary direction within the degree of freedom, and the force can be applied in the arbitrary direction. In the embodiment illustrated in FIG. 2, force can be applied to a movable part, such as the table 4, in an arbitrary direction on an XY plane to move the table or the like. To generate assist force by the servo motor in the direction of the detected and applied force after applying the force to the movable part, such as a table, in an arbitrary direction on the XY plane, the processor obtains force Fx of X-axis components, force Fy of Y-axis components, and composite force F from the detected force transmitted from the force sensors and determines whether or not the composite force F is equal to or greater than the predetermined value in the process of step A2 of FIG. 3. If the processor determines that the composite force F1 is continued for a time equal to or longer than the set threshold in step A5, the processor sets the movement velocity in the direction of the composition force F to the set velocity, obtains the velocities of the X-axis and Y-axis components of the set velocity from the relationship between the force Fx of the X-axis components, the force Fy of the Y-axis components, and the composite force F to set the command velocity of each axis (X axis and Y axis), and drives the servo motor of each axis in step A6. When the magnitude of the force F is changed although the direction of the force applied to the movable part remains unchanged, the velocities of the axes to be increased and decreased in steps A15 and A17 can be obtained by adding and subtracting change amounts $\Delta vx$ and $\Delta vy$ according to the axis components of the detected force to and from the command velocities Vx and Vy of the axes.

In the first mode of manual feed, the movable part is stopped when the direction of the force applied to the movable part is changed (step A10). However, if the direction of the force is changed within the degree of freedom of the movable part (in other words, if the direction of the force in the XY plane is changed), the velocity may be set as a composite velocity, and from the composite velocity, velocity components of the X and Y axes may be obtained and these velocity components may be set as the command velocities of the axes.

Figure 4:
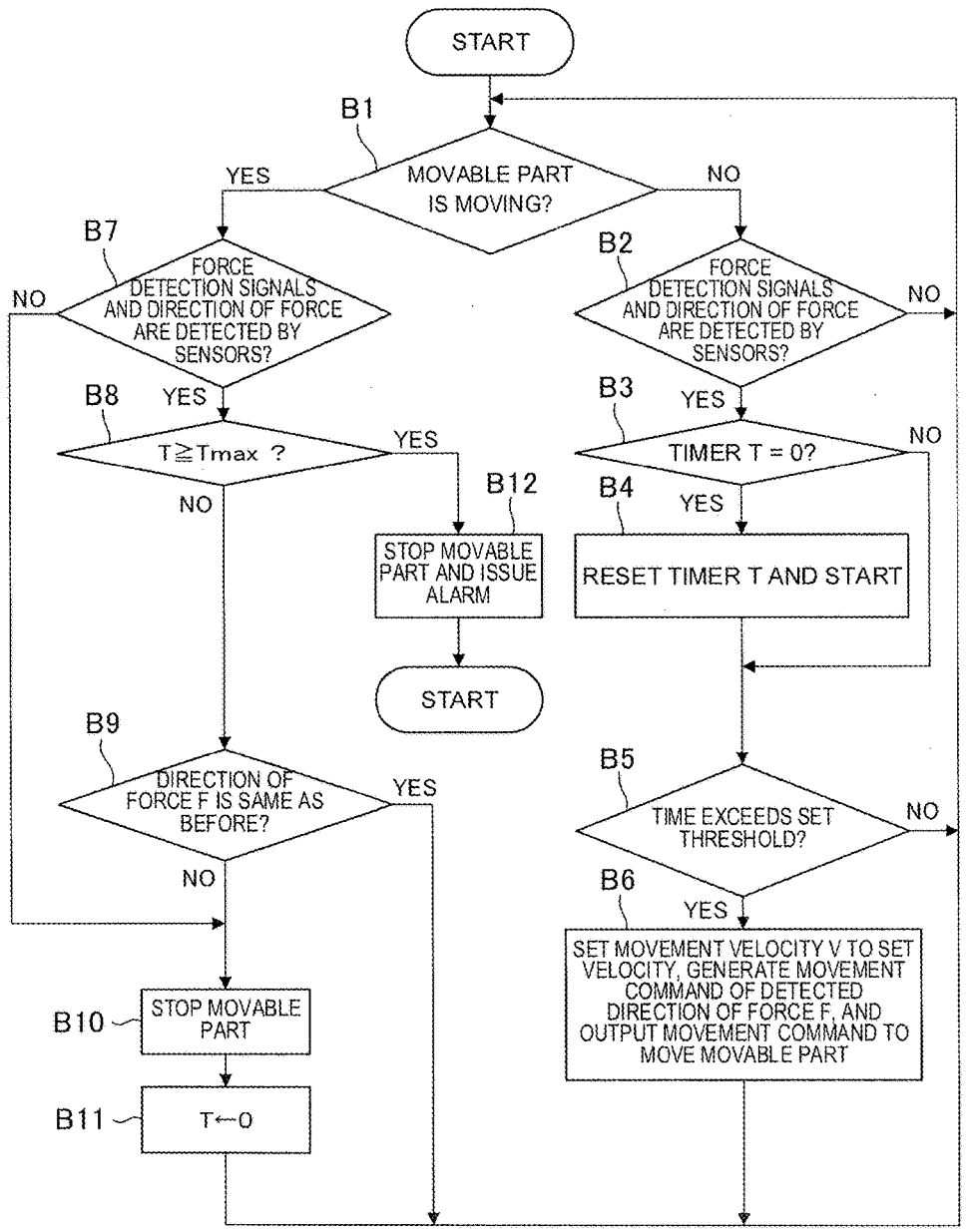
FIG. 4 is a flow chart showing an algorithm of a control process of a second mode of manual feed carried out by the processor of the numerical controller 7.

(2) Second Mode of Manual Feed for Controlling Servo Motor so as to Drive Movable Part at Predetermined Velocity in Direction in which Worker Moves Movable Part, as Long as Worker Applies Force in the Direction, Regardless of Magnitude of Force Applied by Worker In a second mode of manual feed, the first and second force sensors 13 and 14 do not output the magnitude of the force, and it is only necessary that the first and second force sensors 13 and 14 output signals indicating the detection of a force and the direction of the force. Even if the first and second force sensors 13 and 14 output the magnitude of the force, the magnitude is ignored in the second mode. In the second mode, the processor of the numerical controller 7 executes a process equivalent to the process of steps A1 to A6, A7, A8, A10, A18, A19, and A20 of FIG. 3. FIG. 4 is a flow chart showing an algorithm of a control process of the second mode of manual feed.

When the manual feed mode is set in the operation panel or the like of the numerical controller 7, the processor of the numerical controller 7 starts the process illustrated in FIG. 4. When the safety switch 15 is closed, the signals from the first and second force sensors 13 and 14 are input to the numerical controller 7. The processor of the numerical controller 7 determines whether the movable part is moving or not (step B1). If the movable part is not moving, the processor determines whether or not force detection signals and the direction of the force are input from the first and second force sensors 13 and 14 (step B2). If the force detection signals are input, the processor starts the timer T (steps B3 and B4) and determines whether the time counted by the timer T exceeds the set threshold or not (step B5). The processor repeatedly executes the process of steps B1 to B5 until the time exceeds the set threshold. When the time exceeds the set threshold, the processor sets the movement velocity of the movable part to the set velocity, generates a movement command for the direction of the applied force (direction of the detected force), and outputs the movement command to the servo control unit to drive the servomotor to start the movement of the movable part (step B6). Then the process returns to step B1.

When the process returns from step B6 to step B1, the process proceeds from step B1 to step B7 because the movable part is moving. Then the processor determines whether force detection signals are output from the force sensors or not. If the time counted by the timer T is not equal to or greater than the set limit time Tmax (step B8), the processor determines whether or not the detected direction of the force is the same as before (step B9). If the direction is the same, the process returns to step B1 again. The movable part moves in the direction of the applied force at the set velocity, while the force sensors detect the force in the same direction.

On the other hand, if the processor detects that force detection signals are not output from the force sensors in step B7, or if the processor detects that the detected direction of the force is changed in step B9, the processor stops the movement of the movable part (step B10). The processor resets the timer T to "0" (step B11) and returns to step B1. If the detection time of the force detection signals from the force sensors counted by the timer T is equal to or greater than the set limit time Tmax, the processor determines that there is an abnormality and issues an alarm to stop the movement of the movable part (step B12).

In the second mode of manual feed, the mode is also switched to the positioning mode to move the movable part to near the target position and to accurately position the movable part. The movement velocity set in step B6 is set to the set velocity for positioning, and the movable part is moved at a speed lower than the normal velocity.

In the second mode of manual feed, the movement velocity of the movable part is constant, and only two types of movement velocity, the normal movement velocity during manual feed and the movement velocity for positioning, are prepared. However, the movement velocity may be able to be changed to three or more velocities. In this case, movement velocities 1, 2, 3, . . . can be set. One of the set movement velocities can be selected, and the movement velocity selected in step B6 can be set.

In the second mode, the magnitude of the force is not detected, or the magnitude of the force is not used for the control. Therefore, touch sensors may be used in place of the force sensors.

When the touch sensors are used, the touch sensors are installed so that the directions of touching the touch sensors coincide with the directions of the movement of the movable part. For example, in a machine tool in which the movable part, such as the table 4, is driven in the X-axis and Y-axis directions orthogonal to each other, and the mechanical section 10 is driven in the Z-axis direction perpendicular to the XY plane, the touch sensors are arranged on the movable part, such as the table 4 and the workpiece stand 3, on planes in which the directions of touching the touch sensors are an X-axis positive direction and an X-axis negative direction parallel to the X axis (these touch sensors will be referred to as touch sensors X+ and X−). The touch sensors are also arranged on planes in which the directions of touching the touch sensors are a Y-axis positive direction and a Y-axis negative direction parallel to the Y axis (these touch sensors will be referred to as touch sensors Y+ and Y−). For the mechanical section 10, the touch sensors are arranged on planes in which the directions of touching the touch sensors are a Z-axis positive direction and a Z-axis negative direction parallel to the Z axis (these touch sensors will be referred to as touch sensors Z+ and Z−).

For example, if the worker touches the touch sensor X+, the movable part (such as the table 4 and the workpiece stand) moves in the X-axis positive direction coinciding with the touch direction. If the worker touches the touch sensor X−, the movable part (such as the table 4 and the workpiece stand) moves in the X-axis negative direction coinciding with the touch direction. Similarly, if the worker touches the touch sensor Y+, the movable part (such as the table 4 and the workpiece stand) moves in the Y-axis positive direction coinciding with the touch direction. If the worker touches the touch sensor Y−, the movable part (such as the table 4 and the workpiece stand) moves in the Y-axis negative direction coinciding with the touch direction. If the worker touches the touch sensor Z+, the movable part (mechanical section 10) moves in the Z-axis positive direction coinciding with the touch direction. If the worker touches the touch sensor Z−, the movable part (mechanical section 10) moves in the Z-axis negative direction coinciding with the touch direction.

The touch sensors may be arranged on the front surface of the movable part, and a display that allows the feed direction to be clearly recognized may be provided. In the example illustrated in FIG. 1, "right", "left", "front", and "back" are displayed on the front surface of the movable part, such as the table 4, and the touch sensors are arranged for each direction. For the mechanical section 10, "upward" and "downward" are displayed, and the touch sensors are arranged on the entire surface of the mechanical section 10. When the touch sensor of "right" or "left" is touched, the servo motor that moves the movable part, such as the table 4, in the left-right direction can be driven in the instructed direction. When the touch sensor of "front" or "back" is touched, the servo motor that moves the movable part, such as the table 4, in the front-back direction can be driven in the instructed direction. When the touch sensor of "upward" or "downward" is touched, the servo motor that moves the mechanical section can be driven to move the mechanical section 10, which is the movable part, upward or downward in the instructed direction.

In the second mode of manual feed, the sensors detect the force and the direction of the force, and the level of the magnitude of the force is not detected or used. Therefore, when the force is applied in a direction different from the feed axis (X axis, Y axis, and Z axis) directions, the force cannot be decomposed into components of force in the feed axis direction to determine the feed velocity of the feed axis according to the components of force, unlike in the first mode. As a result, for example, when force in the X-axis direction and force in the Y-axis direction are detected at the same time (for example, when the touch sensors X+ and Y+ are touched at the same time), the servo motors of the X axis and the Y axis are driven at the same time, and the movable part (such as the table 4) is moved in the direction of 45 degrees in the XY plane coordinates.

What is claimed is:

1. A numerically controlled machine tool comprising a numerical controller that drives and controls servo motors for driving a plurality of feed axes to move a movable part, the numerically controlled machine tool comprising:
   a sensor provided on the movable part to sense force from outside applied to the movable part and a direction of the force;
   a movement command generation unit that generates a movement command for moving, in the direction of the force detected by the sensor, the movable part in which the force is detected, and
   a safety switch which is configured to block transmission of a signal detected by the sensor in order not to transmit the detected signal to the numerical controller, thereby preventing the movable part from moving despite the intention of an operator who applies a force on the movable part,
   wherein
   the servo motors are driven based on the movement command generated by the movement command generation unit, wherein
   the sensor is a force sensor that detects magnitude of the force and the direction of the force,
   the movement command generation unit is configured to generate the movement command by changing a movement velocity according to a change in the magnitude of the force detected by the sensor,
   the movement command generation unit is configured to move the moveable part when continuous application of a force equal to or greater than a predetermined value for a time longer than a set threshold is sensed, and
   the numerically controlled machine tool is further configured to issue an alarm and stop the movement of the movable part when a force in a same direction of the movement of the movable art is applied to the movable part for a time longer than a predetermined time or a force greater than a predetermined value is applied to the movable part for a time longer than a predetermined time.

2. The numerically controlled machine tool according to claim 1, wherein
   removable jigs are provided on the sensor, and the magnitude of the force and the direction of the force are input to the sensor through the jigs.

3. The numerically controlled machine tool according to claim 1, wherein
   the sensor is a touch sensor, the touch sensor is arranged on a surface of the movable part so that a direction of touching the touch sensor coincides with a direction of a movement axis in which the movable part is to be moved, and the touch sensor detects the direction of the force applied from outside.

4. The numerically controlled machine tool according to claim 1, wherein
   the movement command generation unit is configured to generate the movement command at a set movement velocity that can be switched and set.

5. The numerically controlled machine tool according to claim 1, further comprising:
   signal blocking means for blocking signal transmission, the signal blocking means provided in the middle of transmission means for transmitting a detection signal detected by the sensor to the numerical controller.

6. The numerically controlled machine tool according to claim 1, wherein
   the sensor is provided on a surface of the movable part.

7. The numerically controlled machine tool according to claim 1, wherein
   removable jigs are provided on the sensor, and the magnitude of the force and the direction of the force are input to the sensor through the jigs.

8. The numerically controlled machine tool according to claim 3, wherein
   the movement command generation unit is configured to generate the movement command at a set movement velocity that can be switched and set.

* * * * *